US007725898B2

(12) United States Patent
Chew

(10) Patent No.: US 7,725,898 B2
(45) Date of Patent: *May 25, 2010

(54) SYSTEM FOR DETERMINING CANDIDATE APPLICATIONS FOR TERMINATION BASED ON COMPARING PRIORITY VALUES CALCULATED FROM THE APPLICATION PARAMETER VALUES

(75) Inventor: Chee H. Chew, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1516 days.

This patent is subject to a terminal disclaimer.

(21) Appl. No.: 11/038,443

(22) Filed: Jan. 19, 2005

(65) Prior Publication Data

US 2005/0138448 A1 Jun. 23, 2005

Related U.S. Application Data

(63) Continuation of application No. 09/379,017, filed on Aug. 23, 1999, now Pat. No. 6,910,210.

(60) Provisional application No. 60/110,003, filed on Nov. 24, 1998.

(51) Int. Cl.
*G06F 9/46* (2006.01)
(52) U.S. Cl. .................. 718/103; 718/104; 718/107
(58) Field of Classification Search .............. 707/5, 707/9, 200, 206; 718/1, 100, 102, 103, 104, 718/105, 107
See application file for complete search history.

(56) References Cited

U.S. PATENT DOCUMENTS

| | | | | | |
|---|---|---|---|---|---|
| 4,257,096 | A | * | 3/1981 | McCullough et al. | 718/106 |
| 4,847,751 | A | * | 7/1989 | Nakade et al. | 718/107 |
| 5,168,566 | A | * | 12/1992 | Kuki et al. | 718/103 |
| 5,333,319 | A | * | 7/1994 | Silen | 718/103 |
| 5,487,170 | A | * | 1/1996 | Bass et al. | 710/244 |
| 5,560,011 | A | * | 9/1996 | Uyama | 718/107 |
| 5,689,708 | A | | 11/1997 | Regnier et al. | |
| 5,748,468 | A | * | 5/1998 | Notenboom et al. | 700/3 |
| 5,790,785 | A | | 8/1998 | Klug et al. | |
| 5,835,765 | A | | 11/1998 | Matsumoto | |
| 5,835,767 | A | * | 11/1998 | Leigh | 718/104 |
| 5,963,731 | A | * | 10/1999 | Sagawa et al. | 703/6 |
| 5,978,579 | A | | 11/1999 | Buxton et al. | |
| 6,027,024 | A | | 2/2000 | Knowles | |
| 6,038,571 | A | * | 3/2000 | Numajiri et al. | 707/206 |
| 6,069,882 | A | | 5/2000 | Zellner et al. | |
| 6,128,713 | A | | 10/2000 | Eisler et al. | |
| 6,856,330 | B1 | * | 2/2005 | Chew et al. | 715/745 |
| 6,910,210 | B1 | * | 6/2005 | Chew | 718/103 |

* cited by examiner

*Primary Examiner*—Meng-Ai An
*Assistant Examiner*—Jennifer N To
(74) *Attorney, Agent, or Firm*—Lee & Hayes, PLLC

(57) ABSTRACT

A computer application program executing on a computer, such as a portable computer, is selected for termination by first identifying computer application programs executing on the computer. A priority value is assigned to each of the identified computer applications. The priority value is based on multiple characteristics of the identified computer application programs. The computer application program with the smallest priority value is automatically terminated. If the computer application program with the smallest priority value is in a modal state in which it waits for a response from a user, then a default response is provided to the application prior to terminating the computer application program. The characteristics associated with the computer application programs may include average launch times, average memory usages, a class or type of application, frequencies of usage, and an amount of data stored on the computer by the computer application program.

8 Claims, 5 Drawing Sheets

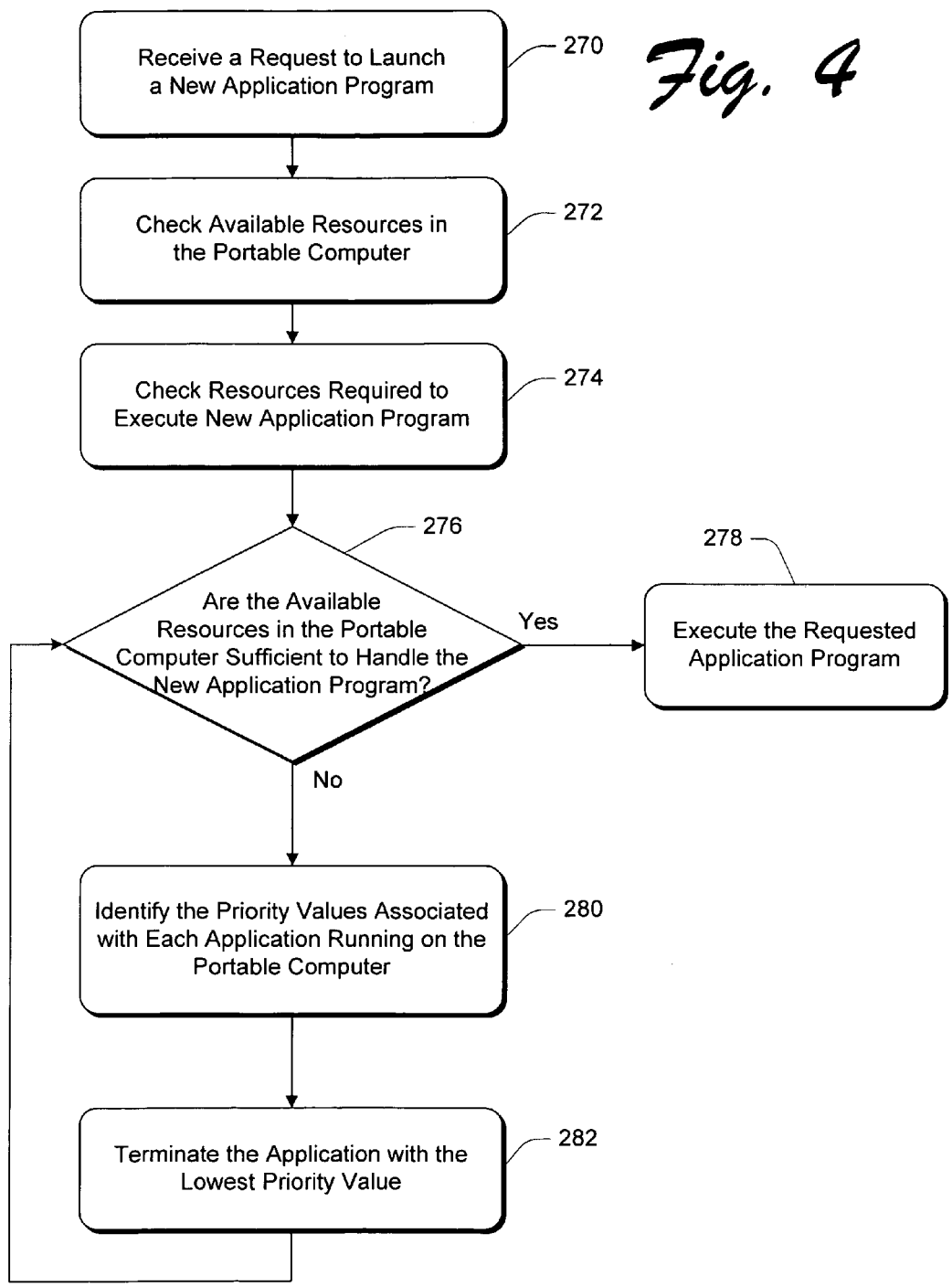

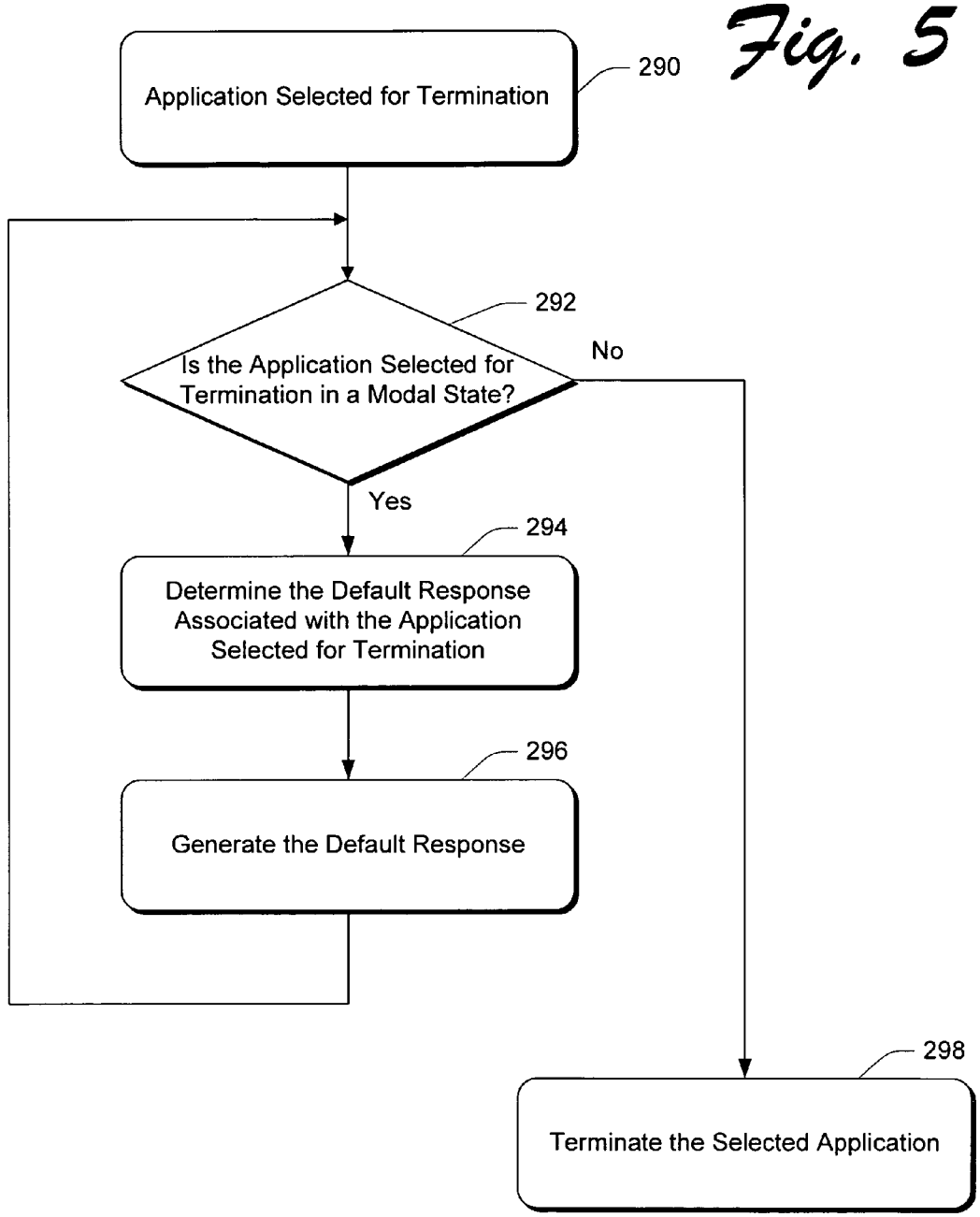

SYSTEM FOR DETERMINING CANDIDATE APPLICATIONS FOR TERMINATION BASED ON COMPARING PRIORITY VALUES CALCULATED FROM THE APPLICATION PARAMETER VALUES

RELATED APPLICATIONS

This continuation application claims priority to U.S. patent application Ser. No. 09/379,017, filed Aug. 23, 1999, entitled "System and Method for Terminating Applications" to Chee H. Chew, issued as U.S. Pat. No. 6,910,210 on Jun. 21, 2005, which in turn claims priority to U.S. Provisional Application No. 60/110,003, filed Nov. 24, 1998, entitled "System and Method for Weighted Application Termination", to Chee H. Chew.

TECHNICAL FIELD

This invention relates to the termination of one or more applications running on a computer. More particularly, the invention relates to selecting a particular application for termination based on a priority value associated with each application running on a computer.

BACKGROUND OF THE INVENTION

Laptop, handheld, and other portable computers or computing devices have increased in popularity as the devices have become smaller in size and less expensive. Additionally, improved operating speed and processing power of portable computers has increased their popularity. Many portable computers are capable of storing multiple application programs, such as address books, games, calculators, and the like. The application programs can be permanently installed in the portable computer during manufacture (e.g., on read-only memory (ROM)). Alternatively, the application programs may be installed by the user after purchasing the portable computer by downloading the application programs to the portable computer from a desktop computer.

Many of these small computers have limited physical resources, such as limited memory and limited processing capabilities. Thus, a typical portable computer may only be capable of executing a small number of application programs simultaneously. In some systems, this problem is addressed by preventing simultaneous execution of multiple applications—by automatically closing any running applications before a new application is launched. While this is a workable solution, it imposes significant delays as a user switches between multiple applications. This type of delay can be frustrating to the user, especially if the applications require a significant amount of time to launch.

In other systems, multiple applications are allowed to execute concurrently. For example, a word processing application, a calendar application, and an address book application might be able to run simultaneously on a portable computer. However, the portable computer may not have sufficient resources remaining to launch an additional application program, such as a calculator. In this situation, one of the three running applications is terminated to reclaim system resources before launching the calculator application.

Typically, a small computer displays only one application at a time, rather than displaying multiple windows such as might be displayed on desktop computers. When a user of a small computer switches from one application to another, only the new application is displayed. Although other applications may continue running on the computer, they are not generally displayed until selected as the active application. Because of this, any non-visible application can be terminated without the notice of the user. When the user attempts to switch back to the terminated application, the terminated application is simply restarted at its previous state.

When an application must be terminated to reclaim resources, existing portable devices make an arbitrary decision as to which application will be terminated. In many cases, the terminated application will be the least recently used application or the longest running application. Additional applications will continue to be terminated until enough system resources are available to initiate the newly selected application. Although this is usually successful, it does have disadvantages. One problem is that the application to be terminated might be in a modal state; i.e., waiting for user input. Attempting to close an application in a modal state may fail if the application refuses to terminate until the requested user input is received. A loss of data may result if the application in a modal state is forced to close before receiving the requested user input.

Another method of reclaiming system resources is to request that the user of a device select from listed applications to terminate. However, this can be confusing to the user, especially a user not familiar with computer systems. The user is not necessarily familiar with the characteristics of the applications and may not understand how different applications interact with one another. Users of portable devices often expect fast operation, for example when retrieving a meeting location from a calendar or a telephone number from an address book. These users may become frustrated if confronted with a question regarding terminating an application when they want to quickly retrieve data from the portable device.

The invention described below addresses these disadvantages and problems by allowing portable computers such as laptop computers, handheld computers, and palmtop computers to terminate one or more applications using a more "intelligent" selection system. In most cases, this greatly improves the operation and efficiency of the computer as perceived by the user, thereby increasing user satisfaction without requiring the addition of system resources such as memory.

SUMMARY OF THE INVENTION

The invention provides a mechanism for terminating an application program to reclaim resources, such as memory or processor resources, in a computer. The invention is particularly useful in small computers, such as palmtop computers, having limited resources (e.g., limited memory and a limited number of concurrent processes). Rather than merely terminating the least recently used application or the longest running application, a computer in accordance with the invention selects the application to terminate based on various characteristics associated with executing applications. After analyzing these various characteristics, the "best" application to terminate is selected and terminated. The selection and termination of the application is performed automatically, without requiring any input from the user of the portable computer.

In accordance with the invention, a computer uses an "intelligent" selection process to determine which application to terminate. First, computer application programs executing on the computer are identified. Next, a priority value is assigned to each of the identified computer application programs. The priority value is determined based on multiple characteristics of the identified computer application programs. The computer application program with the smallest priority value is automatically terminated.

The characteristics associated with each of the computer application programs may indicate average launch times of the program, average memory usages of the program, the class or type of application, frequencies of usage, and the amount of data stored on the computer by the computer application program. The priority value for a particular computer application program can be determined by adding together the values of all parameter values associated with the particular computer application program.

Another aspect of the invention includes determining whether the computer application program selected for termination is in a modal state in which it waits for a response from a user. If the selected application is in a modal state, then the system identifies a default response associated with the computer application program. The default response is provided to the computer application program. The process of identifying and providing default responses to the computer application program is repeated until the computer application program being terminated is in a non-modal state.

BRIEF DESCRIPTION OF THE DRAWINGS

FIG. 4 is a flow diagram illustrating an embodiment of a procedure for reclaiming system resources by terminating one or more applications.

FIG. 5 is a flow diagram illustrating an exemplary procedure for terminating applications in a modal state.

DETAILED DESCRIPTION

Figure 1:
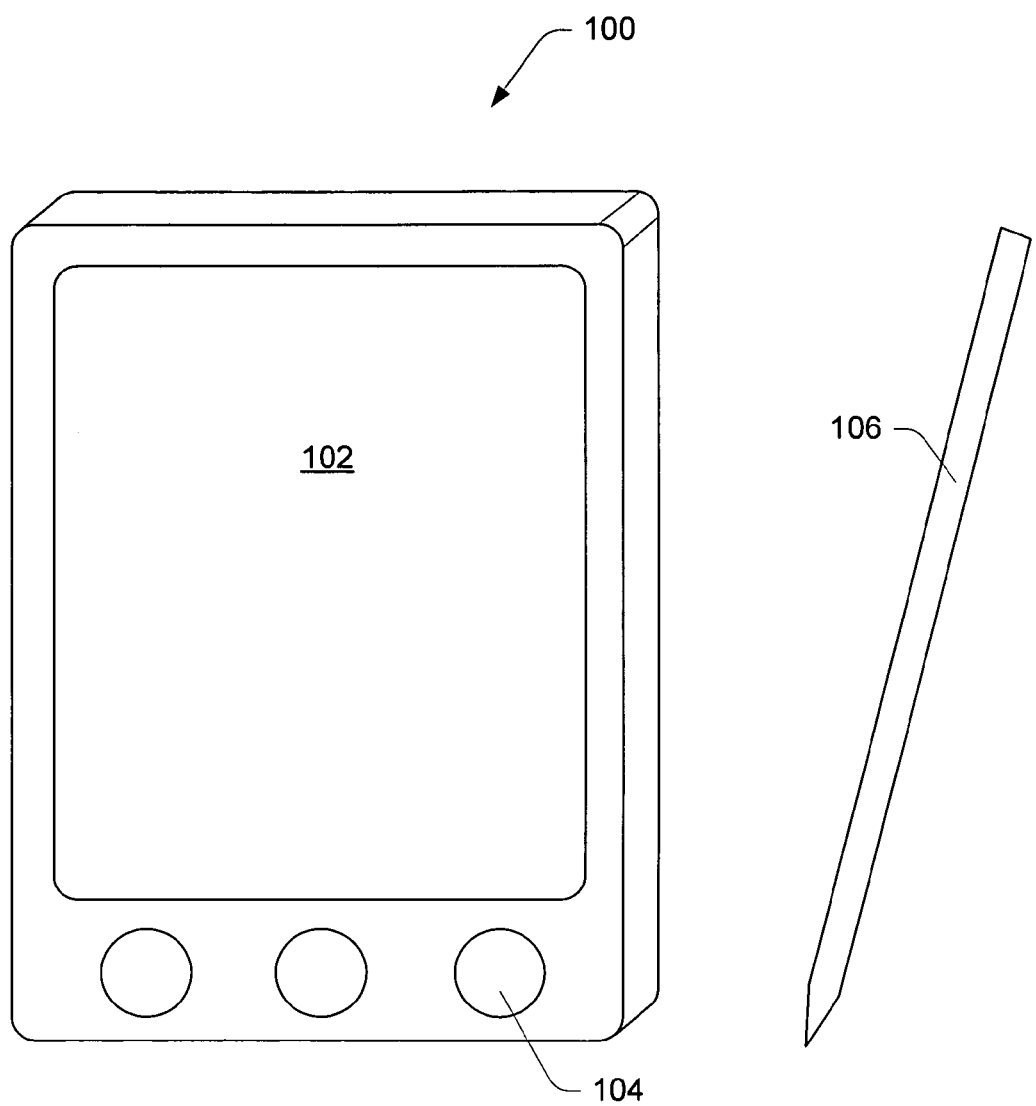
FIG. 1 illustrates an exemplary portable computer in accordance with the invention.

FIG. 1 illustrates an exemplary portable computer 100 in accordance with the invention. Portable computer 100 can be any type of laptop, palmtop, handheld, or other computing device capable of executing one or more application programs. Portable computer 100 includes an LCD display 102 and an input mechanism that is typically something other than a full-size keyboard. Portable computer 100 includes several user input keys or buttons 104. The LCD display 102 is a touch-sensitive screen which, when used in conjunction with a stylus 106, allows a user to input information to portable computer 100. The stylus 106 is used to press the display at designated coordinates for user input. Buttons 104 provide another mechanism for user input. A particular portable computer may have any number of buttons for user input. Additionally, portable computer 100 may also include one or more slots or other receptacles (not shown) capable of receiving peripheral expansion cards.

In other embodiments of portable computer 100, the input mechanism might be a keypad, a track ball, a touch-sensitive pad, a miniaturized QWERTY keyboard, or the like. In other implementations, portable computer 100 may be implemented as a personal digital assistant (PDA), a personal organizer, a palmtop (or handheld) computer, a computerized notepad, or the like.

The application programs executed by portable computer 100 can be factory-installed by the manufacturer or may be contained on a peripheral storage card coupled to portable computer 100. Additionally, application programs can be downloaded into the memory of portable computer 100 from another computer, such as a desktop computer, using a communication link between the desktop computer and portable computer 100. The application programs executed by portable computer 100 include, for example, word processing applications, spreadsheet applications, contact manager applications, and game applications.

Portable computer 100 has a limited amount of memory and processor resources available to execute application programs. If the user of portable computer 100 launches a new application program, it may be necessary to terminate a running application program to reclaim system resources, such as memory or processor resources. As discussed below, the present invention provides a mechanism for selecting a particular application running on portable computer 100 for termination based on a priority value associated with each application running on the portable computer. The selected application is terminated automatically without requiring any input by the user of the portable computer.

Although the present invention can be used with any type of computer system capable of executing application programs, it is particularly useful in computing devices with limited resources (e.g., limited memory or a limited number of concurrent processes). Throughout this specification, exemplary embodiments are described with reference to portable computer 100. However, similar procedures and components can be applied to any type of computing device.

Figure 2:
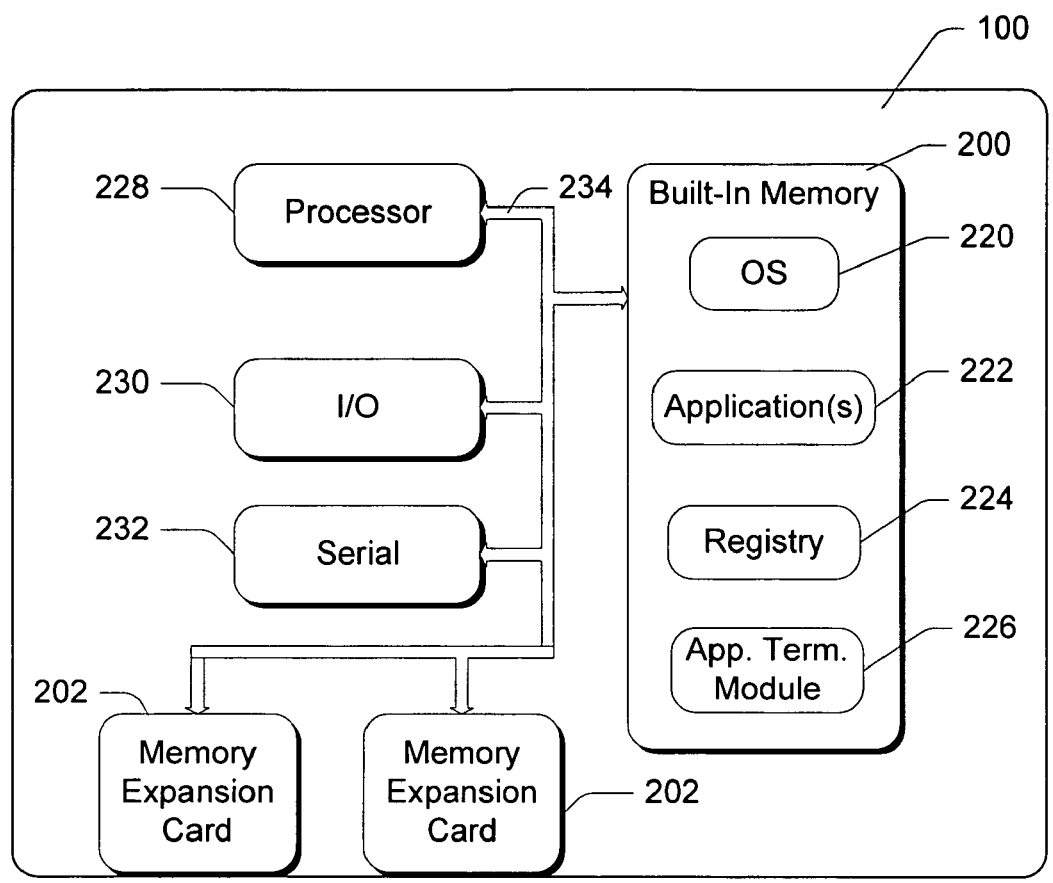
FIG. 2 is a block diagram illustrating pertinent components of a portable computer in accordance with the invention.

FIG. 2 is a block diagram illustrating pertinent components of portable computer 100 in accordance with the invention. Portable computer 100 includes a built-in memory 200 and one or more memory expansion cards 202. A portion of built-in memory 200 is addressable memory for program execution, and the remaining portion is used to simulate secondary disk storage. The memory expansion cards 202 may contain permanently installed applications, such as applications stored in a read-only memory (ROM), not shown. Additionally, memory expansion cards 202 may contain non-volatile memory for storing data or downloaded application programs, thereby supplementing built-in memory 200. Memory expansion cards 202 allow the user of portable computer 100 to customize the device by adding permanently installed application programs or adding memory for storing additional data and downloading additional application programs.

Memory 200 includes an operating system 220, one or more application programs 222, a registry 224, and an application termination module 226. Additionally, portable computer 100 has a processor 228, I/O components 230 (including the display 102 and buttons 104 in FIG. 1), and a serial interface 232 for communicating with other computing devices (such as desktop computer 130 or another portable computer 100). In one embodiment, the various components in portable computer 100 communicate with one another over a bus 234. In one embodiment of portable computer 100, memory 200 is a non-volatile electronic memory such as a random access memory (RAM) with a battery back-up module, not shown. In an alternate embodiment, memory 200 is implemented using a flash memory device. Part of this memory 200 is addressable memory for program execution, and the remaining part is used to simulate secondary disk storage.

Operating system 220 executes on processor 228 from memory 200. In a particular embodiment of the invention, portable computer 100 runs the "Windows CE" operating system manufactured and distributed by Microsoft Corporation of Redmond, Wash. This operating system is particularly designed for small computing devices.

Application programs 222 execute from memory 200 of portable computer 100. The number of application programs 222 that can be simultaneously installed on portable computer 100 is a function of the portion of memory allocated to store application programs and the size of the application programs 222 currently installed.

The operating system 220 maintains registry 224. Registry 224 is a database that is implemented in various forms under different versions of the "Windows" operating systems. The registry contains information about applications stored on portable computer 100. Exemplary registry information includes user preferences and application configuration information. In accordance with the invention, various characteristics of different application programs are stored in the registry. When one or more applications need to be terminated to reclaim system resources, the registry is consulted to determine the "best" application to terminate, based in part upon the stored characteristics.

Application termination module 226 is a software component, and is part of the operating system 220 in the described embodiment. Application termination module 226 contains logic for determining which of the currently executing applications is the best candidate for termination, and then performs the steps necessary to terminate the application. The application to be terminated is identified by comparing priority values associated with the different executing applications. The priority values are calculated by application termination module 226, based on different characteristics of the executing applications. As mentioned above, these characteristics are stored as parameter values in registry 224. For example, the operating system defines the names of the parameters and the applications provide the value associated with the parameter. A parameter such as "class" is defined by the operating system and may have an associated value of "1", "2", or "3". A value of "1" indicates that the application is a personal information manager, a value of "2" indicates that the application is a game, and a value of "3" indicates that the application is a utility. Another parameter such as "memory" has an associated value that indicates the typical memory usage of the application.

Figure 3:
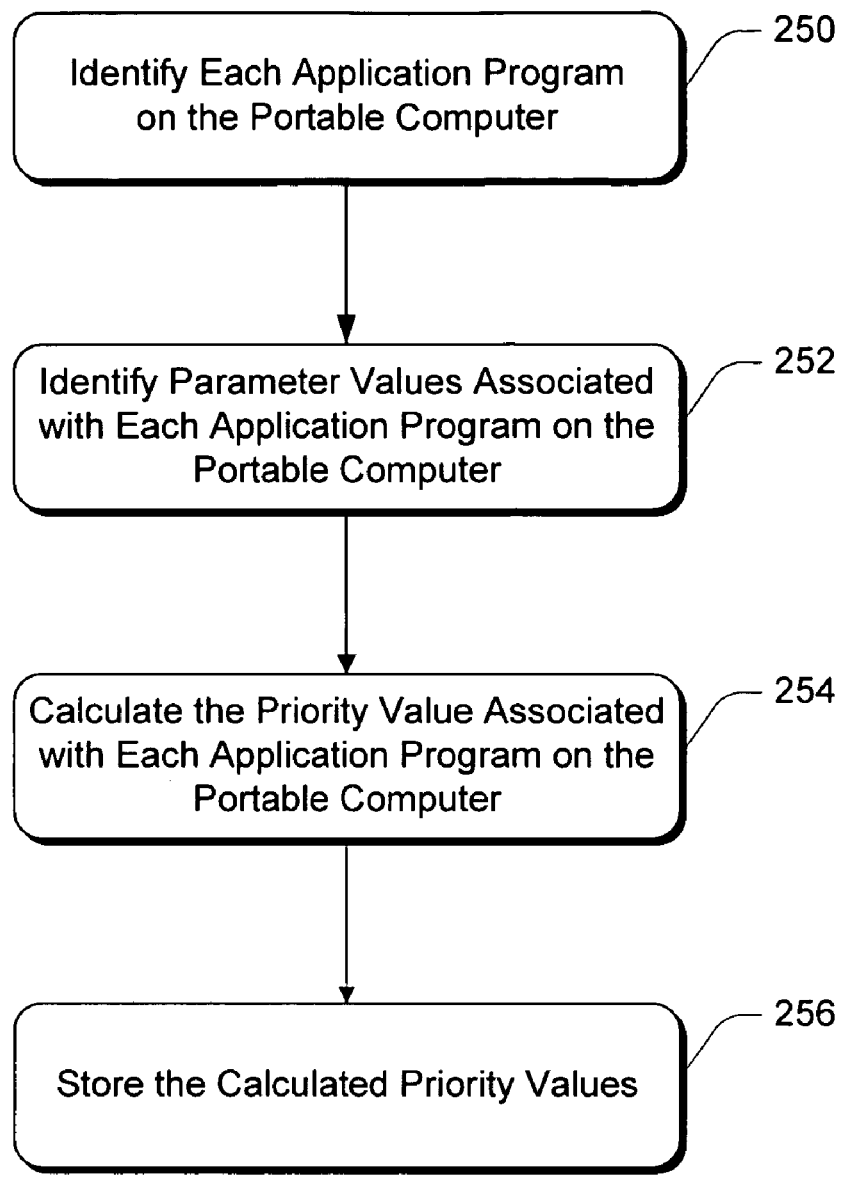
FIG. 3 is a flow diagram illustrating an exemplary procedure for determining priority values associated with applications programs on a portable computer.

FIG. 3 is a flow diagram illustrating an exemplary procedure for determining priority values associated with application programs on a portable computer. Step 250 comprises identifying each application program on the portable computer. Step 252 comprises identifying different characteristics of each application program on the portable computer. Such characteristics are preferably represented by parameter values stored in registry 224. Any number of parameters can be used to identify characteristics of the particular application programs. Typically, the parameter values are set by the developer of each application program. Each of the parameters is related to a characteristic that is useful in determining which application will be terminated. The parameters associated with a particular application are registered with the operating system by calling an API function provided by operating system 220. The operating system, in turn, stores the parameters in registry 224. Typically, the parameters are provided to the operating system by the installation program, when the application is initially installed on the computer. Alternatively, the installation program might copy the parameters directly to the registry or to some other memory location that is accessible to application termination module 226.

Any number of parameters can be used to describe the characteristics of a particular application. For example, an average launch time parameter indicates the time required to restart the application program if it is terminated. An application with a short launch time is more likely to be terminated than an application with a long launch time. An average memory usage parameter indicates the typical amount of memory used by the application program when executing. Applications that use a large amount of memory may be terminated before applications that use less memory.

An application class parameter indicates the application's type, such as a game, utility, or personal information manager (PIM). The application class can be useful in determining which application to terminate. For example, if three games are running, one of the games may be terminated instead of terminating a word processor or PIM. A frequency of usage parameter indicates how often the application program is used or accessed by the user of the portable computer. An infrequently used application program is more likely to be terminated than a frequently used application program. An amount of data stored parameter identifies the quantity of data a user has stored using a particular application program. If a user has stored a significant amount of data using a particular application program, that application program is less likely to be terminated.

After identifying parameter values in step 252, the procedure of FIG. 3 continues to step 254, which comprises calculating a priority value associated with each application program on the portable computer. In one embodiment, step 254 of FIG. 3 calculates the priority value associated with a particular application program by adding the values of all parameters associated with that particular application program. For example, if five parameters are associated with each application program on a portable computer, the priority value is calculated using the following formula, where $P_x$ represents a parameter:

Priority Value=$P_1+P_2+P_3+P_4+P_5$

Typically, the parameters are designed so that higher values indicate less likelihood of an application being terminated. For example, an application that uses a small amount of memory will have a larger memory usage parameter value than an application that uses a large amount of memory. When all of the parameters are added together to determine the priority value, the application with the smallest associated priority value is terminated. Using this formula for calculating the priority value, several parameters are considered when selecting an application to terminate, rather than relying on a single parameter.

In an alternate embodiment, a weighting factor may be applied to each parameter indicating the weight or importance of each parameter. For example, if five parameters are associated with each application program on a portable computer, an important parameter may receive a weighting factor of five and an unimportant parameter may receive a weighting factor of one. Using this alternate embodiment, the priority value can be calculated using the following formula, where $P_x$ represents a parameter and $W_x$ represents a weighting factor associated with the parameter:

Priority Value=$P_1W_1+P_2W_2+P_3W_3+P_4W_4+P_5W_5$

After calculating the priority values in step 254, the procedure of FIG. 3 continues to step 256, which comprises storing the priority values in a register or other storage mechanism. By storing these priority values in a register within the portable computer, the portable computer is able to quickly retrieve the priority values when it has determined that an application needs to be terminated.

Table 1 below illustrates five parameters associated with each of six application programs. Although Table 1 contains five specific parameters, the present invention can use any number of parameters (including parameters not listed in Table 1) to determine priority values associated with application programs. Each parameter value is assigned by each executing application. For example, the value associated with "Average Launch Time" parameter is one per every 100 ms, such that an application with an average launch time of 600 ms has an associated value of six. The value associated with Average Memory Usage indicates the average number of kilobytes of memory used by the application. The application class has an associated number that indicates the class or type of application. For example, 1=a personal information manager (PIM), 2=a game, 3=a utility, and 4=a productivity application). The Frequency of Usage parameter is determined by the operating system based on monitoring the usage of the application. The value associated with the Frequency of Usage parameter may indicate the percentage of total operating time during which the application was executing. For example, if a particular application is executing for a few minutes during each hour that the portable computer is powered on, that application is assigned a Frequency of Usage value of 1. However, an application that runs for the majority of the time that the portable computer is powered on (e.g., 70% of the time), the application is assigned a Frequency of Usage value of 7. The Amount of Data Stored parameter indicates the data storage space used by the application, measured in kilobytes.

TABLE 1

| Application Program | Average Launch Time | Average Memory Usage | Application Class | Frequency of Usage | Amount of Data Stored |
| --- | --- | --- | --- | --- | --- |
| Calculator | 2 | 5 | 3 | 1 | 0 |
| Word Processor | 10 | 20 | 4 | 4 | 15 |
| Spreadsheet | 12 | 30 | 4 | 3 | 12 |
| Calendar | 8 | 20 | 1 | 7 | 22 |
| Address Book | 5 | 10 | 1 | 4 | 18 |
| Solitaire | 3 | 10 | 2 | 1 | 1 |

Certain parameter values (such as application class) can be assigned by the developer of the application program. However, other parameter values (such as frequency of usage and amount of data stored) can only be determined after the application program has been executed for some period of time. These parameters (frequency of usage and amount of data stored) are dependent on the user's habits and program selection rather than being dependent on an inherent characteristic of the application program. The operation of these programs must be monitored to collect data that will define these parameter values.

The procedure described above with respect to FIG. 3 is used by application termination module 226 to calculate a priority value for all application programs on the portable device, regardless of whether the application is currently being executed. In another embodiment of the invention, the procedure of FIG. 3 calculates and stores a priority value for all application programs currently being executed, but does not calculate priority values for application programs that are not running. This alternate embodiment typically reduces the time required to calculate priority values because it ignores applications that are not running. These applications can be ignored because they will not be considered for termination until they are executing. This alternate embodiment calculates and stores the priority value associated with each newly executed application when the application is launched. Thus, priority values are calculated on an as-needed basis in this embodiment.

Similarly, in one embodiment of the invention, Table 1 above contains parameters for every application program stored on the portable computer. In another embodiment, Table 1 contains parameters for running applications, but does not store parameters for non-executing programs. This second embodiment requires storage of fewer parameters and is more efficient because it does not store information for non-running applications, which will not require termination.

In another embodiment of the invention, the priority values are calculated (or recalculated) at the time an application needs to be terminated. Various conditions are considered when assigning or modifying priority values associated with the application programs executing on the portable computer. For example, if multiple games are running on the portable computer, then the older game is assigned a lower priority value (a stronger candidate for termination) because two games are not typically played simultaneously. If the maximum number of concurrent processes is reached, but available memory remains relatively high, then fast-loading applications are assigned a lower priority value because they can be quickly re-loaded if necessary. If memory in the portable computer is low, then applications that use larger amounts of memory are assigned a lower priority value. Applications that have not been accessed during the last user session are assigned a lower priority value because of the lack of use. If a particular portable computer is a PIM, then applications that are classified as non-PIM programs are assigned a lower priority value, thereby giving a preference to PIM applications.

In an exemplary embodiment of the invention, the application with the highest priority value is terminated. Initially, the priority value assigned to each application is zero. In this example, preference is given to PIM applications by adding 100 to the priority value of each non-PIM application. If more than one game is executing simultaneously, the priority value of the first game is not changed, but the priority values of all other games executing simultaneously are increased by 500. For each user session that an application is not used (i.e., the application is executing, but not accessed by the user), the priority value of the application is increased by 250. Thus, the longer an application is not accessed, the greater the possibility that the application will be selected for termination. If the system is low on memory, applications with high memory usage have their priority value increased relative to their memory usage. For example, an application with very high memory usage has its priority value increased by 500 while an application with moderate memory usage has its priority value increased by 250.

Continuing with the exemplary embodiment, if an application has a slow launch time, it is desirable to keep this application executing to avoid a long delay in launching the application after a termination. An application with a slow launch time has its priority value reduced by 100 while an application with a fast launch time has its priority value increased by 100. In certain situations, an application with a particular characteristic may be terminated even though it does not have the highest priority value. For example, if the computer is reaching the maximum number of concurrent processes, an application with a fast launch time may be terminated even if other applications have higher priority values.

FIG. 4 is a flow diagram illustrating an embodiment of a procedure for reclaiming system resources by terminating one or more applications. Step 270 comprises receiving a request to launch a new application program. Step 272 comprises checking the available resources (e.g., available memory and processing resources) in the portable computer. Step 274 comprises checking the resources required to execute the new application program. This information can be obtained, for example, from the parameters associated with the new application. These parameters may indicate the typical memory and other resources required to execute the application on the portable computer.

Step 276 determines whether the available resources in the portable computer are sufficient to handle the new application program. This determination is accomplished by comparing the available resources in the portable computer with the expected resources required to execute the new application (as identified by the parameters associated with the new application). The current resources in the portable computer can be determined by polling for available memory or the number of processes currently running. If the available resources are sufficient to handle the new application, then the procedure branches to step 278, which comprises executing the requested application program.

If the available resources are not sufficient to handle the new application, then the procedure branches from step 276 to step 280, which comprises identifying the priority values associated with each application running on the portable computer. These priority values can be retrieved from the registry or other storage device used in step 256 of FIG. 3. Step 282 of FIG. 4 terminates the application with the lowest priority value. The procedure then returns to step 276 to determine whether the currently available resources (after terminating the application in step 282) are sufficient to handle the new application program. The procedure continues terminating applications until the available resources are sufficient to handle the new application program. Additionally, if the resources are sufficient, but the program scheduler in the portable computer is switching continuously (e.g., thrashing), then step 276 may branch to 280 to terminate an application, even though the current resources are sufficient. Terminating an application prior to launching the new application may help reduce the continuous switching between processes.

The procedure illustrated in FIG. 4 is implemented without requiring any input from the user of the portable computer. Thus, the user of the portable computer selects the new application program to launch by pressing the appropriate button or touch-screen location on the portable computer. The procedure of FIG. 4 is then performed without any further intervention by the user of the portable computer. The user does not know which, if any, applications were terminated. After selecting the new application program to launch, the next item displayed to the user is the information associated with the new application program.

The procedure of FIG. 4 is initiated in response to a request to launch a new application program. In another embodiment, a portion of the procedure of FIG. 4 is executed when available system resources fall below a particular threshold value. For example, if the available memory falls below a predetermined threshold, then steps 280 and 282 in FIG. 4 are executed to terminate an application, thereby reclaiming system resources. In another example, steps 280 and 282 are performed when the number of concurrent processes executing on the portable computer exceeds a threshold. Thus, it is not necessary to wait for a request to launch a new application program before terminating an application. An application can be terminated any time that available system resources fall below a particular threshold.

In one embodiment of the invention, a particular computing device may contain one or more "core" applications that are never candidates for termination. A core application may be required to execute other applications or may represent the most frequently used applications in the computing device. The core application may be selected by the user of the computing device or determined by the computing device itself based on historical application usage or predetermined by the developer of the computing device. For example, if the computing device is primarily used to maintain a calendar of meetings and events, then the calendar application may be designated as a core application because it should always be readily available to the user of the computing device. In other embodiments of the invention, there may be no core application, such that any application is a valid candidate for termination.

To avoid selecting a core application for termination, the computing device may assign a unique code to the application's priority indicating that the application is a core application. Alternatively, a very high priority may be assigned to the core application such that it will always have the highest priority value and, therefore, not be selected for termination.

FIG. 5 is a flow diagram illustrating an exemplary procedure for terminating applications in a modal state. An application in a modal state has requested an input from the user of the application, for example in the form of a dialog box. In the modal state, the application is waiting for the user's response. At step 290, an application is selected for termination. Step 292 determines whether the application selected for termination is in a modal state. If the application is not in a modal state, then the procedure branches to step 298, which terminates the application selected for termination.

Terminating an application in the modal state may result in the loss or corruption of data stored by the application. Therefore, if the application selected for termination is in a modal state, then the procedure continues to step 294 which determines a default response associated with the application selected for termination. One or more default responses may be associated with the application depending on the number of different inputs the application may request from the user. Step 296 generates a default response and communicates the default response to the application, thereby providing the input requested by the application. The procedure then returns to step 298 to be certain that the default response removed the application from its modal state. If the application is no longer in a modal state, then the procedure branches to step 298, which terminates the application. However, if the application remains in a modal state (e.g., the application requested additional input from the user), then the procedure branches to step 294 to identify and generate another default response. The procedure continues providing default responses to the application until the application is in a non-modal state, at which point the application is terminated.

The default responses may be generated by the application itself in response to an operating system request to terminate. Alternatively, the responses can be generated using an application programming interface (API) or similar mechanism that facilitates the creation of default responses. In another embodiment, each application provides one or more default responses to the operating system when the application is launched. If the operating system determines that an application in a modal state should be terminated, then the operating system provides the appropriate default response to the application (i.e., the default response received from the application when launched).

When generating a default response for an application in a modal state, if a termination command is received and the associated application has one or more open dialog boxes, a default response is provided to each open dialog box. If a termination command is received and, later, a request to open a dialog box for the application is received before the application is terminated, then the dialog box is not opened. Instead, the default response that would have been generated if the dialog box was open is returned to the application to allow the application to be terminated without loss or corruption of data.

The described system provides a significant advantage over the prior art. Specifically, it allows applications to be terminated in a way that is least intrusive to the user's actual interaction with a computer. By utilizing appropriate parameters, the perceived responsiveness of the computer will be greatly increased, thereby increasing the usefulness of the computer and in many cases reducing the amount of hardware resources that will be required in the computer.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system, comprising:
   one or more processors;
   a memory that includes a plurality of computer-executable logics, the plurality of computer-executable logics comprising:
   a first logic for determining a candidate application of currently executing applications for termination based on comparing priority values of the currently executing applications, the priority value of each currently executing application being calculated based on application parameter values that are stored in corresponding named parameters defined by an operating system, the application parameter values include:
   a class parameter value that indicates a corresponding currently executing application is one of a plurality of application types, wherein the class parameter value is highest for a core application type of the plurality of application types, and
   an average memory usage parameter value that represents typical memory usage of the corresponding currently executing application; and
   a second logic for terminating the candidate application.

2. The system as recited in claim 1, wherein when the class parameter value is a first pre-defined value, then the corresponding currently executing application comprises a personal information manager, when the class parameter value is a second pre-defined value, then the corresponding currently executing application comprises a game, and when the class parameter value is a third predetermine value, then the corresponding currently executing application comprises a personal utility.

3. The system as recited in claim 1, wherein the core application is an application required to execute other applications or an application most frequently executed of the currently executing applications.

4. A system, comprising:
   one or more processors;
   a memory that includes a plurality of computer-executable logics, the plurality of computer-executable logics comprising:
   a first logic for determining a candidate application of currently executing applications for termination based on comparing priority values of the currently executing applications, the priority value of each currently executing application being calculated based on application parameter values that are stored in corresponding named parameters defined by an operating system, the application parameter values include:
   a class parameter value that indicates a corresponding currently executing application is one of a plurality of application types, the class parameter value being highest for a core application type of the plurality of application types, and wherein a core application is an application required for the execution of another application; and
   an average memory usage parameter value that represents typical memory usage of the corresponding currently executing application; and
   a second logic for terminating the candidate application.

5. The system as recited in claim 4, wherein when the class parameter value is a first pre-defined value, then the corresponding currently executing application comprises a personal information manager, when the class parameter value is a second pre-defined value, then the corresponding currently executing application comprises a game, and when the class parameter value is a third pre-defined value, then the corresponding currently executing application comprises a personal utility.

6. A system, comprising:
   one or more processors;
   a memory that includes a plurality of computer-executable logics, the plurality of computer-executable logics comprising:
   a first logic for determining a candidate application of currently executing applications for termination based on comparing priority values of the currently executing applications, the priority value of each currently executing application being calculated based on application parameter values that are stored in corresponding named parameters defined by an operating system, the application parameter values include:
   a class parameter value that indicates a corresponding currently executing application is one of a plurality of application types, wherein when the class parameter value is a first pre-defined value, then the corresponding currently executing application comprises a personal information manager, when the class parameter value is a second pre-defined value, then the corresponding currently executing application comprises a game, and when the class parameter value is a third pre-defined value, then the corresponding currently executing application comprises a personal utility, and
   an average memory usage parameter value that represents typical memory usage of the corresponding currently executing application; and
   a second logic for terminating the candidate application, wherein the application parameter values are stored in corresponding named parameters that are defined by an operating system.

7. The system as recited in claim 6, wherein the class parameter value is highest for a core application type of the plurality of application types.

8. The system as recited in claim 7, wherein the core application is an application required to execute other applications or an application most frequently executed of the currently executing applications.

* * * * *